(12) United States Patent
Matsumoto

(10) Patent No.: US 9,615,211 B2
(45) Date of Patent: Apr. 4, 2017

(54) SERVER FOR HOME APPLIANCE NETWORK SYSTEM

(75) Inventor: Koji Matsumoto, Osaka (JP)

(73) Assignee: Panasonic Intellectual Property Management Co., Inc., Osaka (JP)

(*) Notice: Subject to any disclaimer, the term of this patent is extended or adjusted under 35 U.S.C. 154(b) by 421 days.

(21) Appl. No.: 14/124,553

(22) PCT Filed: Jun. 14, 2012

(86) PCT No.: PCT/JP2012/065212
§ 371 (c)(1),
(2), (4) Date: Dec. 6, 2013

(87) PCT Pub. No.: WO2013/002034
PCT Pub. Date: Jan. 3, 2013

(65) Prior Publication Data
US 2014/0095663 A1 Apr. 3, 2014

(30) Foreign Application Priority Data
Jun. 30, 2011 (JP) ................. 2011-145982

(51) Int. Cl.
G06F 15/16 (2006.01)
H04W 4/02 (2009.01)
H04L 29/08 (2006.01)

(52) U.S. Cl.
CPC ............. *H04W 4/025* (2013.01); *H04L 67/04* (2013.01)

(58) Field of Classification Search
CPC ................. H04L 67/04; H04W 4/025
(Continued)

(56) References Cited

U.S. PATENT DOCUMENTS 6,870,480 B2* 3/2005 Suzuki ................. G05B 15/02
340/531
7,577,910 B1* 8/2009 Husemann ............ G06F 9/4445
715/744
(Continued)

FOREIGN PATENT DOCUMENTS

JP 11272388 A * 10/1999 ............. G06F 19/00
JP 2002-109203 A 4/2002
(Continued)

OTHER PUBLICATIONS

Pu, Research of Home Network Based on Internet and SMS, 978-1-4244-4589-9/09 IEEE, 2009, pp. 1-5.*
(Continued)

*Primary Examiner* — Moustafa M Meky
*Assistant Examiner* — Thorne E Waugh
(74) *Attorney, Agent, or Firm* — Renner, Otto, Boisselle & Sklar, LLP

(57) ABSTRACT

A server (3) includes a server communication unit (302) for communicating with a portable terminal (1) and a home appliance (2), a position-determining unit (304) for acquiring information on a position of the terminal (1) during communication, an initial screen storage (305) for storing different position conditions and a collection of screen information defining respective content of initial screens corresponding to the conditions, and an activation unit (306). If position information obtained based on the information on the position acquired through the position-determining unit (304) corresponds to any position condition of the different position conditions, the unit (306) retrieves screen information defining content of an initial screen corresponding to the position condition from the storage (305) to provide the terminal (1) with the information.

9 Claims, 6 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 7,778,654 | B2* | 8/2010 | Ahn | .................... H04L 12/2809 |
| | | | | 370/338 |
| 7,957,733 | B2* | 6/2011 | Wang | ................... G06Q 10/087 |
| | | | | 455/414.1 |
| 8,082,164 | B2 | 12/2011 | Kakuta et al. | |
| 8,135,398 | B2* | 3/2012 | Wang | ................... G06Q 10/087 |
| | | | | 455/414.1 |
| 8,281,357 | B2 | 10/2012 | Chiba et al. | |
| 2003/0136827 | A1* | 7/2003 | Kaneko | ............... H04L 12/2803 |
| | | | | 235/375 |
| 2004/0181439 | A1 | 9/2004 | Kakuta et al. | |
| 2006/0153214 | A1* | 7/2006 | Moore, Jr. | .......... H04L 12/2803 |
| | | | | 370/401 |
| 2006/0155398 | A1* | 7/2006 | Hoffberg | ................ G05B 15/02 |
| | | | | 700/86 |
| 2008/0209034 | A1* | 8/2008 | Shin | .................... H04L 12/2807 |
| | | | | 709/224 |
| 2008/0307480 | A1 | 12/2008 | Chiba et al. | |

FOREIGN PATENT DOCUMENTS

| | | |
|---|---|---|
| JP | 2002-164836 A | 6/2002 |
| JP | 2002-267487 A | 9/2002 |
| JP | 2002-291058 A | 10/2002 |
| JP | 2003-223599 A | 8/2003 |
| JP | 2004-192017 A | 7/2004 |
| JP | 2004-272736 A | 9/2004 |
| JP | 2005-295160 A | 10/2005 |
| JP | 2008-305160 A | 12/2008 |
| JP | 2010-256106 A | 11/2010 |

OTHER PUBLICATIONS

Wikipedia—Location-based service—control plane locating, GPS trilateration, Nov. 6, 2010.*
Whatis.com, What is Home Location Register (HLR)?, Jan. 11, 2011, p. 1.*
Whatis.com, What is GSM?, 2010, p. 1.*
International Search Report for corresponding International Application No. PCT/JP2012/065212 with English translation thereof, mailed Jul. 31, 2012.
Written Opinion for corresponding International Application No. PCT/JP2012/065212, dated Jul. 31, 2012.

* cited by examiner

FIG. 3

INITIAL SCREEN

| PORTABLE TERMINAL 1 | | PORTABLE TERMINAL 2 | | ... |
|---|---|---|---|---|
| POSITION CONDITION | SCREEN CONTENT | POSITION CONDITION | SCREEN CONTENT | |
| WITHIN 50M FROM USER'S HOME | OPERATION PAGE FOR ELECTRONIC LOCK | | | |
| KEIHAN XX STATION | OPERATION PAGE FOR AIR-CONDITIONER | | | |
| KEIHAN XXX STATION | COMPLETION NOTICE PAGE OF LIGHTING CONTROL | | | |
| WITHIN 5KM FROM USER'S HOME | OPERATION PAGE FOR HOME GATEWAY DEVICE | | | |
| XXXX HOTEL | MONITORING PAGE BY SECURITY CAMERA | | | |
| 200KM OR MORE FROM USER'S HOME | OPERATION PAGE FOR SECURITY CAMERA | | | |
| NORTH LATITUDE 31.XXXXXX, EAST LATITUDE 135.XXXXXX | OPERATION PAGE FOR SECURITY CAMERA | | | |
| ... | | | | |

FIG. 4

HOME POSITION INFORMATION

| PORTABLE TERMINAL 1 | | ... |
|---|---|---|
| ADDRESS | COORDINATES | |
| XX-XX-XX, XX-KU, OSAKA CITY, OSAKA PREFECTURE | NORTH LATITUDE 34.XXXXXX, EAST LATITUDE 135.XXXXX | |

FIG. 5

| | PORTABLE TERMINAL 1 | | | |
|---|---|---|---|---|
| | PRIORITY CONDITION 1 | | PRIORITY CONDITION 2 | |
| PRIORITY ORDER | POSITION CONDITION | PRIORITY ORDER | POSITION CONDITION | ... |
| 1 | KEIHAN XX STATION | 1 | XXXX HOTEL | |
| 2 | WITHIN 5KM FROM USER'S HOME | 2 | 200KM OR MORE FROM USER'S HOME | |

FIG. 6

| AUTOMATIC CONTROL INSTRUCTION | | | | |
|---|---|---|---|---|
| PORTABLE TERMINAL 1 | | PORTABLE TERMINAL 2 | | |
| POSITION CONDITION | CONTROL INSTRUCTION AND CONTROL OBJECT | POSITION CONDITION | CONTROL INSTRUCTION AND CONTROL OBJECT | ... |
| WITHIN 50M FROM USER'S HOME | TURNING ON LIGHTING APPARATUS | | | |
| ... | | | | |

SERVER FOR HOME APPLIANCE NETWORK SYSTEM

TECHNICAL FIELD

The invention relates to a server for a home appliance network system.

BACKGROUND ART

Conventionally, there is proposed a server for a home appliance network system such as, for example, a remote control monitoring service system for housing life equipment unit through a portable terminal to be operated by a contracted user described in Japanese Patent Application Publication Number 2002-109203 (hereinafter referred to as "Document 1"). The remote control monitoring service system is configured to perform automatic control of household appliances installed in a user's house based on position information of a user's portable terminal.

There is however a problem that a user needs to operate the terminal in order to display an objective page after logging-in, because a top page is initially displayed on a screen of the terminal after logging-in in many conventional service systems such as the system as shown in Document 1. In some conventional service systems, a page other than a top page can be initially displayed on the screen, but the page initially displayed is fixed. Therefore, when the objective page is a page other than the page initially displayed, a user still needs to operate the terminal in order to display an objective page.

SUMMARY OF INVENTION

In order to solve the problems described above, an object of the present invention is to provide a server capable of reducing complexity and time in screen switching.

The present invention is a server (3) for a home appliance network system and constitutes the home appliance network system along with (at least) a portable terminal (1) and (at least) a home appliance (2). In order to solve the problems described above, the server (3) is characterized by comprising a server communication unit (302), a position-determining unit (304), an initial screen storage (305) and an activation unit (306). The server communication unit (302) is configured to communicate with the portable terminal (1) and the home appliance (2). The position-determining unit (304) is configured to acquire information on a position of the portable terminal (1) during communication through the server communication unit (302). The initial screen storage (305) is configured to store different position conditions and a collection of screen information defining respective content of initial screens corresponding to the position conditions. The activation unit (306) is configured: if position information obtained based on the information on the position acquired through the position-determining unit (304) corresponds to any position condition of said different position conditions, to retrieve screen information defining content of an initial screen corresponding to the position condition from the initial screen storage (305); and to provide the portable terminal (1) with the screen information.

In an embodiment, the server (3) further comprises an appliance controller (301) configured to control the home appliance (2) in accordance with a control instruction supplied through the portable terminal (1), and an identification processing unit (303) configured to specify the portable terminal (1) during communication through the server communication unit (302). The position-determining unit (304) is configured to acquire position information of the portable terminal (1) during communication through the server communication unit (302) to determine a position of the portable terminal (1).

In an embodiment, the server (3) further comprises a position information storage (307) configured to store position information of a house in which the home appliance (2) is installed. In this embodiment, the position-determining unit (304) is configured to obtain a distance of the portable terminal (1) from the house as the position information based on the information on the position of the portable terminal and the position information of the house stored in the position information storage (307).

In an embodiment, the server (3) further comprises a map information acquisition unit (308) configured to acquire map information. In this embodiment, the position-determining unit (304) is configured to acquire a point of the portable terminal (1) on a map as the position information based on the information on the position of the portable terminal and the map information acquired through the map information acquisition unit (308).

In an embodiment, the server (3) further comprises: a position information storage (307) configured to store position information of a house in which the home appliance (2) is installed; a map information acquisition unit (308) configured to acquire map information; and a priority condition storage (309). In this embodiment, the position-determining unit (304) is configured to obtain first position information and second position information as said position information. The position-determining unit is configured to obtain a distance of the portable terminal (1) from the house based on the information on the position of the portable terminal and the position information of the house stored in the position information storage (307) and to thereby obtain the first position information. The position-determining unit is also configured to obtain a point of the portable terminal (1) on a map based on the information on the position of the portable terminal and the map information acquired through the map information acquisition unit (308) and to thereby obtain the second position information. The initial screen storage (305) is configured to store different first position conditions that are relevant to the first position information and a collection of screen information defining respective content of initial screens corresponding to the first position conditions. The initial screen storage is also configured to store different second position conditions that are relevant to the second position information and a collection of screen information defining respective content of initial screens corresponding to the second position conditions. The priority condition storage (309) is configured to store first conditions for priority respectively corresponding to the different first position conditions and second conditions for priority respectively corresponding to the different second position conditions. The activation unit (306) is configured, if the first position information obtained through the position-determining unit (304) corresponds to any first position condition of the different first position conditions and the second position information obtained through the position-determining unit (304) corresponds to any second position condition of the different second position conditions, to read out a first condition for priority and a second condition for priority respectively corresponding to the first position condition and the second position condition from the priority condition storage (309). The activation unit is also configured to select a position condition corresponding to a condition for priority higher between the first condition for priority and the second condition for priority from the first position condition and the second position condition. The activation unit is further configured to retrieve screen information defining content of an initial screen corresponding to the selected position information from the initial screen storage (305) to provide the portable terminal (1) with the screen information.

In an embodiment, the server (3) comprises an automatic control instruction storage (310) configured to store one or more automatic control instructions, as a control instruction with respect to the home appliance (2), corresponding to one or more position conditions of said different position conditions, respectively. In this embodiment, the appliance controller (301) is configured, if the position information obtained based on the information on the position acquired through the position-determining unit (304) corresponds to any automatic control instruction of one or more automatic control instructions stored in the automatic control instruction storage (310), to retrieve the automatic control instruction from the automatic control instruction storage (310) to control the home appliance (2) in accordance with the automatic control instruction. The initial screen storage (305) is configured so that one or more initial screens respectively corresponding to one or more automatic control instructions stored in the automatic control instruction storage (310) previously contain control completion notices by the one or more automatic control instructions. For example, in the case where the automatic control instruction storage (310) stores one automatic control instruction corresponding to one position condition of the different position conditions as the control instruction with respect to the home appliance (2), the initial screen storage (305) is configured so that one initial screen corresponding to the automatic control instruction previously contains a control completion notice by the automatic control instruction. In the case where the automatic control instruction storage (310) stores automatic control instructions corresponding to position conditions of the different position conditions as the control instruction with respect to the home appliance (2), the initial screen storage (305) is configured so that initial screens respectively corresponding to the automatic control instructions previously contain respective control completion notices by the automatic control instructions. That is, each of the initial screens previously contains a control completion notice by a corresponding automatic control instruction.

The server of the invention can reduce complexity and time in screen switching just after logging-in by displaying a preset variable initial screen on a portable terminal in response to a position of the portable terminal.

BRIEF DESCRIPTION OF DRAWINGS

Preferred embodiments of the invention will now be described in further details. Other features and advantages of the present invention will become better understood with regard to the following detailed description and accompanying drawings where:

FIG. 3 illustrates an example of memory content of an initial screen storage in the embodiment;

FIG. 4 illustrates an example of memory content of a position information storage in the embodiment;

FIG. 5 illustrates an example of memory content of a priority condition storage in the embodiment;

FIG. 6 illustrates an example of memory content of an automatic control instruction storage in the embodiment;

DESCRIPTION OF EMBODIMENTS

Figure 1:
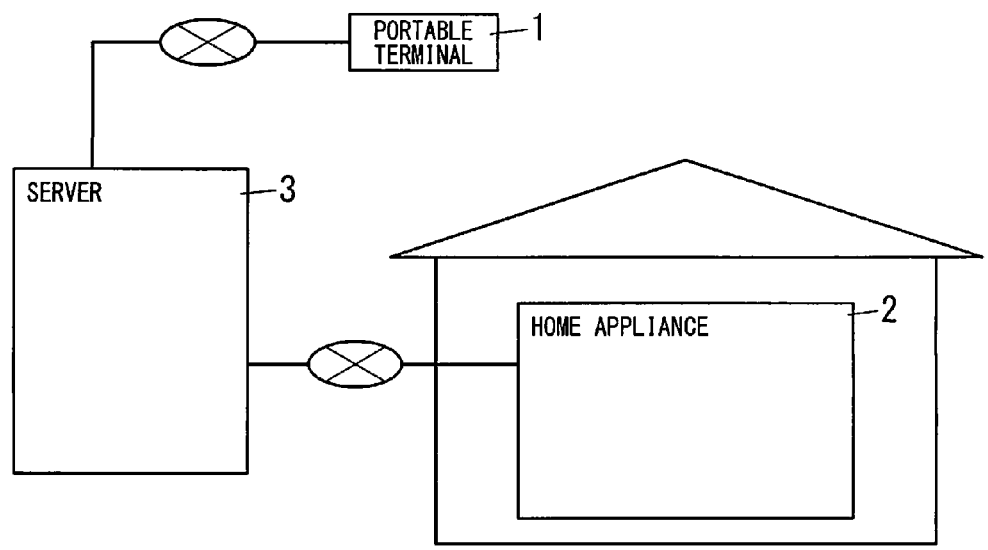
FIG. 1 is a schematic diagram of a home appliance network system in accordance with an embodiment of the invention.

Hereafter embodiments of the present invention will be described with reference to figures. In each figure, like kind elements will be assigned the same reference numerals and the explanation will be omitted. The embodiments only show examples of the invention, and the invention is not limited to the embodiments.

Figure 2:
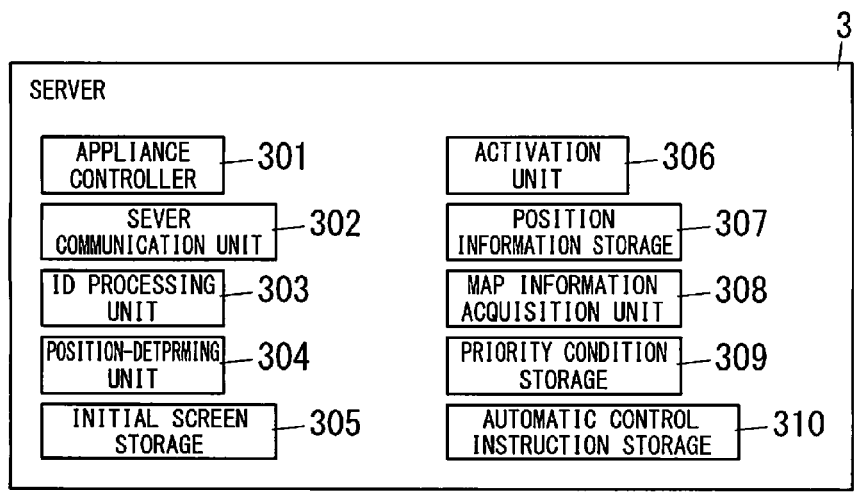
FIG. 2 is a block diagram of a server for the home appliance network system.

FIGS. 1 and 2 show an embodiment of the invention. A server 3 for a home appliance network system (hereinafter simply referred to as a "server 3") constitutes the home appliance network system along with at least a portable terminal 1 and at least a home appliance 2. The portable terminal 1 is, for example, a mobile phone or the like. The home appliance 2 is, for example, an appliance used in a house, such as a lighting apparatus, an air-conditioner, an electronic lock, a security camera or the like. These home appliances 2 are configured to communicate with the portable terminal 1 and the server 3 via the internet through a home gateway device. The portable terminal 1 and the server 3 are also configured to communicate with each other via the internet. In an example, the home appliance network system is provided for houses each of which includes portable terminals 1 and home appliances 2. In an example, the home appliance network system is provided for houses each of which includes a portable terminal 1 and a home appliance 2. For example, identifiers are each allocated to houses, and each of one or more portable terminals 1 and one or more home appliances 2 included in each house are related to each other by an identifier of its own house.

As a brief of the embodiment, the server 3 is used for a home appliance network system having a portable terminal 1, a home appliance 2 and the server 3. The server 3 includes an appliance controller 301, a server communication unit (a communicator) 302, an identification processing unit (identifier) 303, a position-determining unit (a locator) 304, an initial screen storage 305 and an activation unit (a retriever) 306. The appliance controller 301 is configured to control the home appliance 2 in accordance with a control instruction supplied from the portable terminal 1. The server communication unit 302 is configured to communicate with the portable terminal 1 and the home appliance 2. The identification processing unit 303 is configured to specify (e.g., authenticate) the portable terminal 1 during communication therewith through the server communication unit 302. The position-determining unit 304 is configured to acquire information on a position of the portable terminal 1 during communication through the server communication unit 302. In the embodiment, the position-determining unit 304 is configured to acquire information on a position of the portable terminal 1, during communication through the server communication unit 302, specified through the identification processing unit 303.

The initial screen storage 305 is configured to store different position conditions and a collection of screen information defining respective content of initial screens corresponding to the position conditions. In an example, the home appliance network system includes portable terminals 1, and the initial screen storage 305 is configured to previously store different position conditions and a collection of screen information defining respective content of initial screens corresponding to the position conditions, per portable terminal 1.

The activation unit 306 is configured, if position information obtained based on the information on the position acquired through the position-determining unit 304 corresponds to any position condition of the different position conditions, to retrieve screen information defining content of an initial screen corresponding to the position condition from the initial screen storage 305 to supply the screen information to the portable terminal 1. The different position conditions are relevant to respective position information obtained through the position-determining unit 304. In an example, position information is obtained based on the information on the position acquired through the position-determining unit 304 from the portable terminal 1 specified through the identification processing unit 303. In this example, the activation unit 306 is configured, if the position information corresponds to any position condition of the different position conditions, to retrieve screen information defining content of an initial screen corresponding to the position condition from the initial screen storage 305 to supply the screen information to the portable terminal 1.

The server 3 also includes a position information storage 307 configured to store position information of a house in which the home appliance 2 is installed, a map information acquisition unit (a map builder) 308 configured to acquire map information, and a priority condition storage 309. In an embodiment, the home appliance network system includes portable terminals 1, and the position information storage 307 is configured to store position information, of a house in which the home appliance 2 is installed, per portable terminal 1.

The position-determining unit 304 is configured to obtain first position information and second position information as the aforementioned position information. The position-determining unit is configured to obtain the first position information by obtaining a distance of the portable terminal 1 from the house based on the information on the position of the portable terminal and position information of the house stored in the position information storage 307. The position-determining unit is configured to obtain the second position information by obtaining a point of the portable terminal 1 on a map based on the information on the position of the portable terminal and map information acquired through the map information acquisition unit 308. The initial screen storage 305 is configured to store: different first position conditions that are relevant to the first position information (specifically respective first position information acquired through the position-determining unit 304); and a collection of screen information defining respective content of initial screens corresponding to the first position conditions. The initial screen storage is also configured to store: different second position conditions that are relevant to the second position information (specifically respective second position information acquired through the position-determining unit 304); and a collection of screen information defining respective content of initial screens corresponding to the second position conditions. The priority condition storage 309 is configured to store first conditions for priority respectively corresponding to the different first position conditions and second conditions for priority respectively corresponding to the different second position conditions. In an example, the priority condition storage 309 is configured to previously store first conditions for priority and second conditions for priority per portable terminal 1.

The activation unit 306 is configured, if the first position information obtained through the position-determining unit 304 corresponds to any first position condition of the different first position conditions and the second position information obtained through the position-determining unit 304 corresponds to any second position condition of the different second position conditions, to read out first condition for priority and second condition for priority respectively corresponding to the first position condition and the second position condition from the priority condition storage 309. The activation unit 306 is configured to then select a position condition corresponding to a condition for priority higher between the first condition for priority and the second condition for priority from the first position condition and the second position condition. The activation unit is configured to retrieve screen information defining content of an initial screen corresponding to the selected position condition from the initial screen storage 305 to supply the screen information to the portable terminal 1. In an example, each of first position information and the second position information is obtained based on the information on the position acquired through the position-determining unit 304 from the portable terminal 1 specified through the identification processing unit 303.

The server 3 further includes an automatic control instruction storage 310 configured to store one or more automatic control instructions as a control instruction with respect to the home appliance 2. The one or more automatic control instructions correspond to one or more position conditions of the aforementioned different position conditions, respectively. In an example, the automatic control instruction storage 310 is configured to previously store the aforementioned different position conditions and the aforementioned one or more automatic control instructions, per portable terminal 1. The appliance controller 301 is configured, if the position information obtained based on the information on the position acquired through the position-determining unit 304 corresponds to (any of) one or more automatic control instructions stored in the automatic control instruction storage 310, to retrieve the automatic control instruction from the automatic control instruction storage 310 to control the home appliance 2 in accordance with the automatic control instruction. In an example, the position information is obtained based on the information on the position acquired through the position-determining unit 304 from the portable terminal 1 specified through the identification processing unit 303.

The initial screen storage 305 is configured so that one or more initial screens respectively corresponding to one or more automatic control instructions stored in the automatic control instruction storage 310 previously contain control completion notices by the one or more automatic control instructions (i.e., corresponding completion notices).

The activation unit 306 is configured, if position information obtained through the position-determining unit 304 corresponds to any position condition of the different position conditions, to retrieve screen information defining content of an initial screen corresponding to the position condition from the initial screen storage 305 to supply the screen information to the portable terminal 1. In this case, if the screen information contains a completion notice, the completion notice is displayed on the portable terminal 1.

Hereafter the server 3 of the embodiment is described in detail.

In accordance with a control instruction supplied from the portable terminal 1, the appliance controller 301 controls the home appliance 2 that is relevant to the control instruction. Examples of the control instruction include turning on a lighting apparatus, powering on an air-conditioner, opening an electronic lock, and the like. The appliance controller 301 also controls the home appliance 2 based on an automatic control instruction stored in the automatic control instruction storage 310. The automatic control instruction is a control instruction to be executed with no operation input via the portable terminal 1 after logging-in in the case where the position of the portable terminal 1 meets a specified position condition when the portable terminal 1 logs in to the server 3. The automatic control instruction contains identification information of the home appliance 2 under the control. When performing control based on the automatic control instruction, the appliance controller 301 searches a position condition corresponding to position information obtained based on the information of the position acquired through the position-determining unit 304 while referring to the automatic control instruction, of the portable terminal 1 during communication specified through the identification processing unit 303, stored in the automatic control instruction storage 310. As a result, if the automatic control instruction corresponding to the position condition exists, the appliance controller 301 performs control corresponding to the position condition with respect to the home appliance 2. For example, it is supposed that an automatic control instruction for powering on an air-conditioner is stored with respect to a portable terminal 1 along with a position condition of a range within one kilometer from home. In this case, the appliance controller 301 powers on the air-conditioner set as a controlled object if judging that the position of the portable terminal 1 determined through the position-determining unit 304 meets the position condition.

The server communication unit 302 communicates with the portable terminal 1 and the home appliance 2 via the internet.

The identification processing unit 303 specifies the portable terminal 1 during communication through the server communication unit 302. The identification processing unit 303 has a storage configured to retain a database of authentication information. If the identification processing unit receives a communication request from a portable terminal 1, the identification processing unit requests, for example, ID and password of the terminal unit constituting authentication information to verify the authentication information based on the database, thereby specifying the portable terminal 1. The authentication information may be unique identification information of the terminal unit 1 and the like for example.

The position-determining unit 304 is configured to acquire information on a position of the portable terminal 1 during communication with the portable terminal 1 to obtain position information of the portable terminal 1. The information on the position is to be transmitted along with authentication information when the portable terminal 1 transmits the authentication information thereof to the server 3. The information on the position is, for example, coordinate information such as geographic coordinates and the like to be acquired with GPS or the like. The position-determining unit 304 is configured to obtain a distance between the portable terminal 1 and a house corresponding to the portable terminal 1 as the position information of the portable terminal 1 during communication, and also to obtain a point of the portable terminal 1 on a map. Specifically, the position-determining unit 304 is configured to calculate a distance to the portable terminal 1 from the house that is home of a user of the portable terminal 1 based on the information on the position transmitted from the portable terminal 1 and position information of the user's home stored in the position information storage 307. The position-determining unit 304 is configured to determine that the portable terminal 1 exists at a place that is the calculated distance apart from the user's home. The position-determining unit 304 is also configured to obtain a point of the portable terminal 1 on a map based on the information on the position transmitted from the portable terminal 1 and map information acquired through the map information acquisition unit 308. The position-determining unit 304 is also configured to determine that the point is the position of the portable terminal 1. For example, if a place indicated by coordinates of the portable terminal 1 is a point of XX station (XX represents a station name) on the map, the position-determining unit 304 determines that the position of the portable terminal 1 is a position of the XX station.

The initial screen storage 305 previously stores different position conditions and a collection of screen information defining respective content of initial screens corresponding to the position conditions, per portable terminal 1. The initial screen storage 305 is configured so that control completion notices by the one or more automatic control instructions with respect to a home appliance 2, respectively corresponding to one or more position conditions of the different position conditions, are previously contained in one or more initial screens corresponding to the one or more automatic control instructions. Each of the initial screens is a screen displayed just after a login screen when a user logs in to the server 3 through the user's portable terminal 1. In many cases, each initial screen is a top page. Screen content may be stored along a position condition only in a case where a screen other than a top page needs to be displayed as an initial screen, or screen content may be stored along with each position condition. Screen content corresponding to a position condition not set in particular can be a screen of a top page in the case where screen content may be stored along with each position condition. FIG. 3 shows an example of a table stored in the initial screen storage 305. In this example, the storage stores position conditions in the case where a screen other than a top page is set to an initial screen, and screen content of initial screens to be displayed under the position conditions, respectively, per portable terminal 1 in the home appliance network system. For example, "within 50 m from user's home" is a position condition and screen content corresponding to the position condition is "page for operating electronic lock" in a porch, which are stored. In addition, "KEIHAN XXX station" (XXX represents a station name) is a position condition and screen content corresponding to the position condition is "page of lighting control completion notice" with respect to a home appliance 2 such as a lighting apparatus, which are stored. Thus, screen content may contain control completion notice with respect to a home appliance 2. Position conditions and screen content corresponding thereto are input to the portable terminal 1 and stored in the initial screen storage 305 through the server communication unit 302. The position conditions and the screen content corresponding thereto may be input by logging in to the server 3 though a personal computer or the like. Some position conditions and the screen content corresponding thereto may be stored as default data.

The activation unit 306 is configured to refer to screen content, stored in the initial screen storage 305, of the portable terminal 1 during communication specified through the identification processing unit 303 to search a position condition corresponding position information obtained through the position-determining unit 304. The activation unit is configured, if the position condition corresponds to a position condition of any screen content, to transmit screen information (data) of screen content corresponding to the position condition to the portable terminal 1, thereby providing the portable terminal 1 with an initial screen. In this case, the activation unit 306 is configured to choose a position condition corresponding to either a distance or a point in accordance with a condition for priority against the portable terminal 1 stored in the priority condition storage 309 in a case where the distance and the point as position information of the portable terminal 1 correspond to position conditions of different screen content, respectively. The activation unit 306 is configured to then provide the portable terminal 1 with an initial screen of screen content corresponding to the position condition. The activation unit 306 is configured to provide the portable terminal 1 with a predetermined top page as an initial screen if position information of the portable terminal 1 during communication determined through the position-determining unit 304 does not correspond to any position conditions of screen content.

The position information storage 307 is configured to store position information of a house in which home appliances 2 corresponding to the portable terminal 1 are installed, where the position information is, for example, an address and coordinates. FIG. 4 shows an example of a table stored in the position information storage 307.

The map information acquisition unit 308 is configured to acquire map information through, for example, the internet or the like. The map information is information indicating a position of a particular spatial point or area.

The priority condition storage 309 is configured to previously store a condition for priority per portable terminal 1, where the condition for priority is a condition to be prioritized in a case where, in screen content stored in the initial screen storage 305, a distance and a point as position information obtained through the position-determining unit 304 correspond to different position conditions, respectively. That is, the condition for priority indicates the order of priority regarding competing position conditions. FIG. 5 shows an example of a table stored in the priority condition storage 309. For example, if KEIHAN XX station is at a position that is 3 km apart from the user's home, the position-determining unit 304 determines, as a position of the portable terminal 1, a distance (first position information) of 3 km from the user's home and a point on a map (second position information) indicating the KEIHAN XX station when the portable terminal 1 is at KEIHAN XX station. This position meets both a position condition (a first position condition) within 5 km from the user's home and a position condition (a second position condition) of KEIHAN XX station. In such a case, if screen content corresponding to the position condition (the second position condition) of KEIHAN XX station needs to be chosen, what is needed is to set first and second conditions for priority so that the position condition (the second position condition) of KEIHAN XX station is more prioritized than the first position condition as shown in FIG. 5. In an example of FIG. 5, the first condition for priority corresponding to the first position condition has a second order of priority, while the second condition for priority corresponding to the second position condition has a first order of priority.

The automatic control instruction storage 310 is configured to previously store a position condition and an automatic control instruction corresponding to the position condition, per portable terminal 1, where the automatic control instruction is a control instruction with respect to the home appliance 2. That is, the storage stores information of a position condition(s), a home appliance(s) 2 and an control instruction(s), per portable terminal 1 in the home appliance network system, wherein: a position condition is a condition for automatically controlling a home appliance 2, after logging in; and a home appliance 2 and an control instruction corresponds to control by the position condition. An automatic control instruction may be stored only in a case where the control needs to be performed in response to a corresponding position condition, or may be stored with respect to each position condition. In the case where an automatic control instruction is set with respect to each position condition, an automatic control instruction of not performing control is stored with respect to a position condition(s) for a home appliance(s) 2 that does(do) not need to be controlled. Each of the automatic control instructions corresponds to a control completion notice, stored in the initial screen storage 305, contained in screen content for a home appliance 2. In a case where a home appliance 2 needs to be automatically controlled in accordance with a position condition, what is needed is to store a control instruction in the automatic control instruction storage 310 with the instruction related to the position condition, and also to store a control completion notice of the control instruction in the initial screen storage 305 with the notice related to the position condition. Such work for a relation between the initial screen storage 305 and the automatic control instruction storage 310 may be confirmed by a user, or may be checked automatically through the server 3. In the latter case, an alarm may be given to the user when unconformity exists. When an automatic control instruction is stored, a completion notice corresponding thereto may be automatically set to screen content. On the contrary, when a completion notice is stored as screen content, an automatic control instruction corresponding thereto may be set automatically. In a case where an initial screen is matched with an automatic control instruction, when a control is performed in accordance with the automatic control instruction, the control completion notice is invariably provided through the initial screen. The order of priority is sufficient to be stored, only with respect to a position condition of each initial screen, in the priority condition storage 309. FIG. 6 shows an example of a table stored in the automatic control instruction storage 310. Input setting of the memory content can be performed in the same way as the initial screen storage 305.

Figure 7:
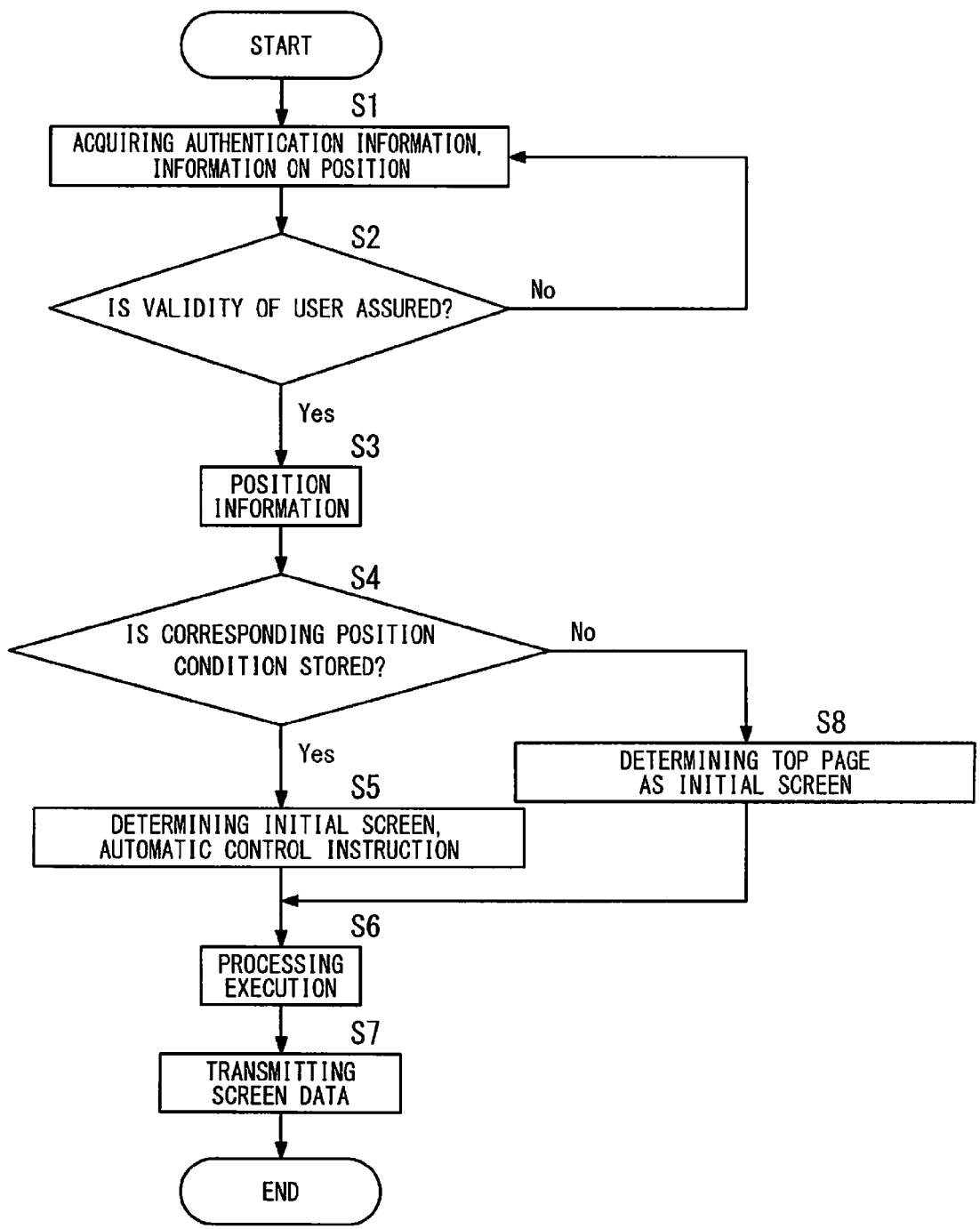
FIG. 7 is a flow chart of the server in the embodiment.

Hereinafter an operation of the server 3 is explained with reference to a flow chart of FIG. 7.

A user first displays a log-in page provided by the server 3 through the user's portable terminal 1 in order to use a service by the server 3. Authentication information input by the user and information on a position of the portable terminal 1 are then transmitted from the portable terminal 1 to the server 3. In a case where unique information of the portable terminal 1 is employed as the authentication information, the input thereof by the user is unnecessary. The server 3 receives the authentication information and the information on the position (step S1).

The identification processing unit 303 performs an authentication processing of the portable terminal 1 during communication based on the authentication information, and permits a next processing by the position-determining unit 304 if accepting proof of identity of the user of the portable terminal 1 ("Yes" at step S2). The identification processing unit 303 does not permit further processing if not accepting proof of identity of the user ("No" at step S2). Step S1 is then returned to.

If the identification processing unit 303 accepts proof of identity of the user ("Yes" at step S2), the position-determining unit 304 obtains position information of the portable terminal 1 based on the information on the position transmitted from the portable terminal 1 (step S3).

The activation unit 306 refers to part (a field) corresponding to the portable terminal 1 during communication in the initial screen storage 305 and the automatic control instruction storage 310 to search a position condition corresponding to the position information obtained at step S3. As a result, if the initial screen storage 305 stores the position condition corresponding to the position information obtained at step S3 ("Yes" at step S4), the activation unit 306 retrieves screen content corresponding to the position condition to determine the content as an initial screen. If the position information also corresponds to a position condition of an automatic control instruction in the automatic control instruction storage 310, the activation unit retrieves the corresponding automatic control instruction (step S5). If no corresponding position condition is stored in the automatic control instruction storage ("No" at step S4), the activation unit 306 determines a top page as an initial screen (step S8).

The activation unit 306 performs a processing for displaying, on the portable terminal 1, screen content determined at step S5 or step S8 as an initial screen after logging-in. When an automatic control instruction is determined at step S5, the appliance controller 301 performs a processing for controlling the automatic control instruction (step S6).

The activation unit 306 transmits screen information (data) of the initial screen to the portable terminal 1 through the server communication unit 302 (step S7).

Thus, the server 3 of the embodiment allows the portable terminal 1 to display a preset initial screen in response to a position of the portable terminal 1. It is accordingly possible to save operations such as screen scrolling, menu clicking for moving from a top page to an objective operation page in a case where same operations are repeated at a particular position. The user can perform an objective operation such as, for example, a power ON or OFF operation of a home appliance 2, an operation for monitoring an image of a monitoring device as a home appliance 2, relatively quickly after logging-in. It is also possible to shorten a waiting time till completion of communication for screen display required for page scrolling. Not only the waiting time can be shortened but also communications traffic can be reduced. For example, if the portable terminal 1 is a mobile phone or the like, the packet communication fee can be reduced. A load on the server 3 can be lowered by reducing page scrolling by a user, or the number of URL access to URLs. They can have a large effect in a period of time when an increase in communication traffic is expected, such as lunch break, rush hour and the like in particular. There are different tendencies between desired services for controlling home appliances and a user's current position or a distance from the current position to user's home. Examples thereof include a service for an electronic lock in a porch when the user's current position is near the user's home, a service for power control of a home appliance when the user is on the way home, and a service for security monitoring when the user is far apart from the user's home. In the embodiment, it is therefore possible to save labor for operations and also to shorten a waiting time during communication by choosing an initial screen in response to a position of the portable terminal 1. As a result, a user can more quickly start utilization of such a service. That is, a user can be expected to utilize comfortable services.

The server 3 of the embodiment is configured to allow the portable terminal 1 to display a preset initial screen in response to a distance between the portable terminal 1 and user's home. It is accordingly possible to set screen content of an initial screen in response to a distance from user's home to display the initial screen. For example, when a user logs in to the server 3 within a range that is 50 m or less apart from user's home, a page for operating an electronic lock in a porch can be displayed as an initial screen.

The server 3 of the embodiment is configured to allow the portable terminal 1 to display a preset initial screen in response to a point of the portable terminal 1 on a map. It is accordingly possible to set screen content of an initial screen in response to the point to display the initial screen. For example, when a user uses a train to log in to the server 3 at a specified station, a page for operating an air-conditioner can be displayed as an initial screen. This example based on not a distance from user's home but the aforementioned point such as, for example, a station or the like is effective in a case where a user commutes to work by train, or in a case where a user moves by ordinary moving means having different movement speeds such as on foot and by train.

The server 3 of the embodiment is configured to allow the portable terminal 1 to display a preset initial screen in response to a position of the portable terminal 1 in consideration of both a distance between the portable terminal 1 and user's home and a point of the portable terminal 1 on a map. The server 3 is configured, if a position condition for the distance competes with a position condition for the point, to determine either of them based on a predetermined order of priority. A user can define a position condition to be prioritized when competing position conditions exist, and accordingly expect that a desired processing will be performed in response to the position of the portable terminal.

The server 3 of the embodiment is configured to perform predetermined control in response to a position of the portable terminal 1 to allow the portable terminal 1 to display a screen for showing the completion of the control as an initial screen. That is, the operation is automatically performed without using a page for operating a home appliance 2 even if a user does not operate each time in a case where same operations are assumed at a specified position each time. A screen containing a notice of the completion is then displayed. It is therefore possible to save labor for operations and also to confirm the completion of control without labor and time for screen scrolling and the like.

The present embodiment is configured to obtain, as position information, a distance between the portable terminal 1 and user's home and a point of the portable terminal 1 on a map, but may be configured so that a point of the portable terminal 1 on a map is not considered. In this case, the server 3 includes an appliance controller 301, a server communication unit 302, an identification processing unit 303, a position-determining unit 304, an initial screen storage 305 and an activation unit 306. The appliance controller 301 is configured to control a home appliance 2 in accordance with a control instruction input from a portable terminal 1. The server communication unit 302 is configured to communicate with the portable terminal 1 and the home appliance 2. The identification processing unit 303 is configured to specify the portable terminal 1 during communication through the server communication unit 302. The position-determining unit 304 is configured to acquire information on a position of the portable terminal 1 during communication to obtain position information based on the information on the position. The initial screen storage 305 is configured to previously store different position conditions and a collection of screen information defining respective content of initial screens corresponding to the position conditions, per portable terminal 1. The activation unit 306 is configured to retrieve an initial screen corresponding to a position condition for the position information obtained through the position-determining unit 304 based on screen content, for the portable terminal 1 during communication specified through the identification processing unit 303, stored in the initial screen storage 305. The activation unit 306 is configured to then provide the portable terminal 1 with the initial screen. The server 3 further includes a position information storage 307 configured to store position information of a house in which a home appliance(s) 2 is(are) installed, per portable terminal 1. In this case, the position-determining unit 304 is configured to obtain, as position information of a portable terminal 1, a distance of the portable terminal 1 from the house based on the information on the position of the portable terminal 1 during communication and the position information of the house corresponding to the portable terminal 1 stored in the position information storage 307.

Figure 8:
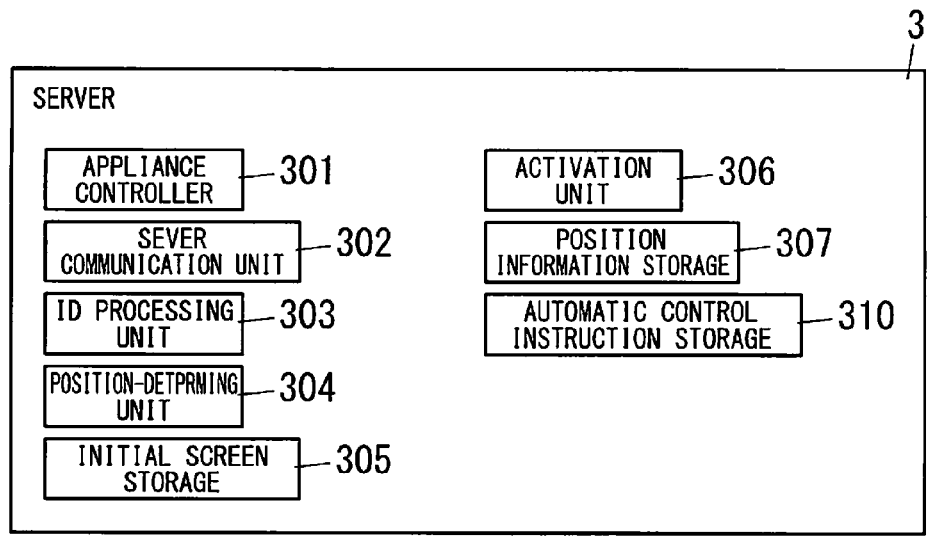
FIG. 8 is a block diagram of a server in accordance with an embodiment of the invention in the case where the server excludes a point thereof.

In this case, the map information acquisition unit 308 may be omitted as shown in a configuration of FIG. 8. The priority condition storage 309 is not necessary either. It is however desirable that the priority condition storage 309 be employed, because there is a possibility that some position conditions compete with each other in case where one, such as coordinates, other than a distance between the portable terminal 1 and user's home is dealt as a position of the portable terminal 1.

The present embodiment is configured to obtain, as position information, a distance between the portable terminal 1 and user's home and a point of the portable terminal 1 on a map, but may be configured so that a distance between the portable terminal 1 and user's home is not considered. In this case, the server 3 includes an appliance controller 301, a server communication unit 302, an identification processing unit 303, a position-determining unit 304, an initial screen storage 305 and an activation unit 306. The appliance controller 301 is configured to control a home appliance 2 in accordance with a control instruction input from a portable terminal 1. The server communication unit 302 is configured to communicate with the portable terminal 1 and the home appliance 2. The identification processing unit 303 is configured to specify the portable terminal 1 during communication through the server communication unit 302. The position-determining unit 304 is configured to acquire information on a position of the portable terminal 1 during communication to obtain position information based on the information on the position. The initial screen storage 305 is configured to previously store different position conditions and a collection of screen information defining respective content of initial screens corresponding to the position conditions, per portable terminal 1. The activation unit 306 is configured to retrieve an initial screen corresponding to a position condition for the position information obtained through the position-determining unit 304 based on screen content, for the portable terminal 1 during communication specified through the identification processing unit 303, stored in the initial screen storage 305. The activation unit 306 is configured to then provide the portable terminal 1 with the initial screen. The server 3 further includes a map information acquisition unit 308 configured to acquire map information. In this case, the position-determining unit 304 is configured to obtain a point of the portable terminal 1 on a map as position information of the portable terminal 1 based on the information on the position of the portable terminal 1 during communication and the map information acquired through the map information acquisition unit 308.

Figure 9:
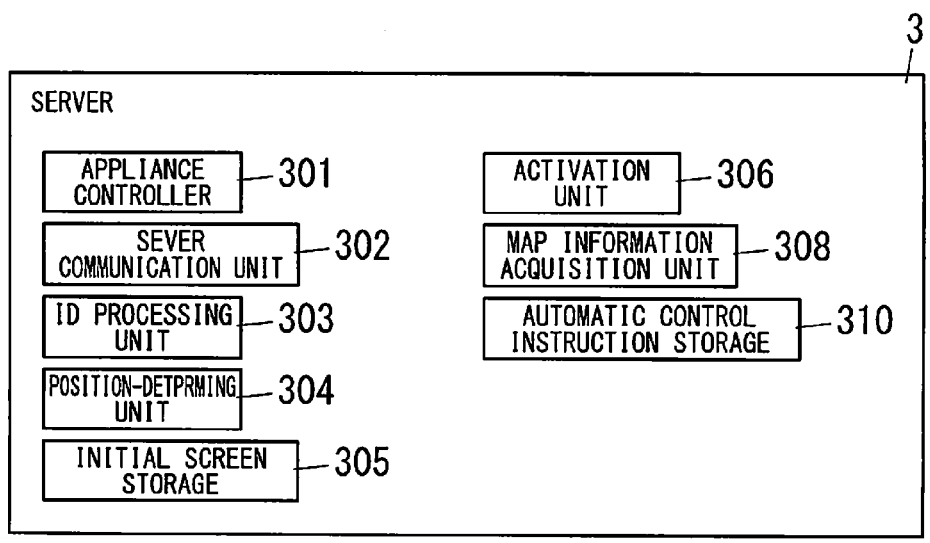
FIG. 9 is a block diagram of a server in accordance with an embodiment of the invention in the case where the server excludes a distance thereof.

In this case, the position information storage 307 is unnecessary as shown in a configuration of FIG. 9. The priority condition storage 309 is not necessary either. It is however desirable that the priority condition storage 309 be employed, because there is a possibility that some position conditions compete with each other in case where one, such as coordinates, other than a point on a map is dealt as a position of the portable terminal 1.

Figure 10:
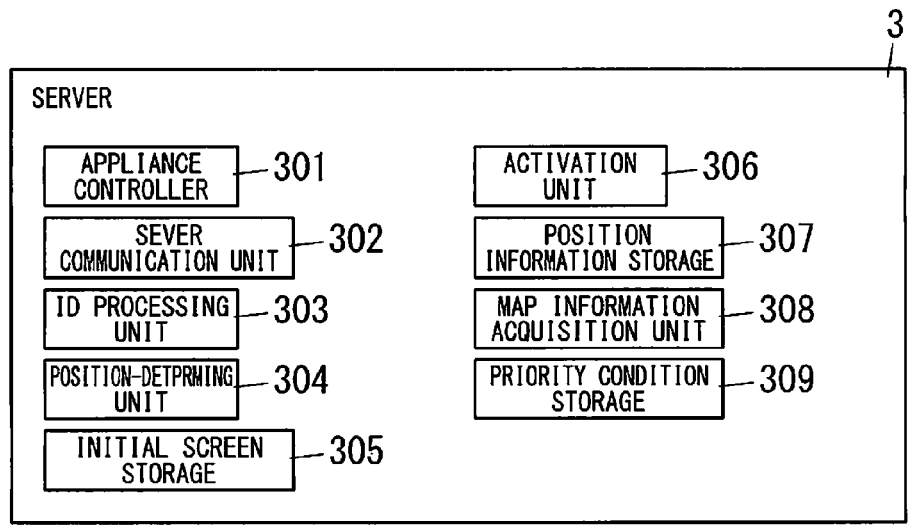
FIG. 10 is a block diagram of a server in accordance with an embodiment of the invention in the case where the server excludes control based on an automatic control instruction.

The present embodiment is configured to perform predetermined control in response to position information of the portable terminal 1 to allow the portable terminal 1 to display a screen for showing the completion of the control as an initial screen, but this configuration may be omitted as shown in FIG. 10.

Figure 11:
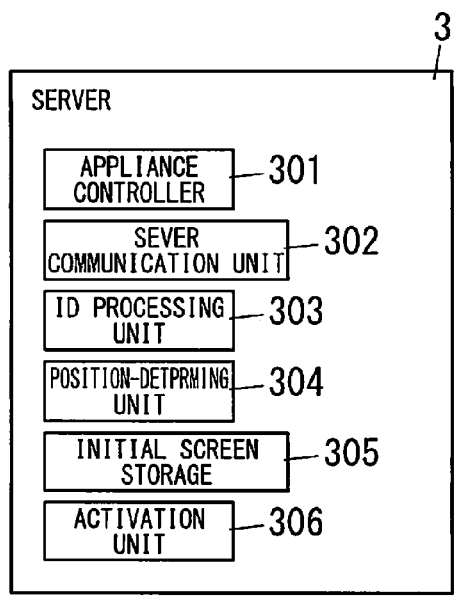
FIG. 11 is a block diagram of a server in accordance with an embodiment of the invention in the case where the server excludes a point and a distance thereof and control based on an automatic control instruction.

In the present embodiment, a distance between the portable terminal 1 and user's home or a point of the portable terminal 1 on a map is employed as position information of the portable terminal 1, but one other than the distance and the point may be employed as position information of the portable terminal 1. For examples, coordinates may be employed as position information of the portable terminal 1. In a case where the information on the position transmitted from the portable terminal 1 is coordinate information thereof, the position-determining unit 304 may be configured to determine that coordinates thereof is the position information of the portable terminal 1. In this case, the position information storage 307 and the map information acquisition unit 308 are unnecessary as shown in FIG. 11. In an example, coordinate information may be employed as a position of the portable terminal 1 in addition to a distance between the portable terminal 1 and user's home or a point of the portable terminal 1 on a map.

As an example, a permissible range may be provided for determining whether position information of the portable terminal 1 meets a position condition stored in the initial screen storage 305 or the automatic control instruction storage 310. That is, even if the position information does not exactly meet the position condition, the position information may be considered to meet the position condition as long as being within the permissible range. For example, it is supposed that position information of the portable terminal 1 is a point of 10 m from KEIHAN XX station towards the next station. This position does not exactly meet a position condition of KEIHAN XX station, but meets the position condition of KEIHAN XX station when the permissible range is a range defined by the radius of 30 m. The permissible range may be set in a lump or may set per position condition.

Although the present invention has been described with reference to certain preferred embodiments, numerous modifications and variations can be made by those skilled in the art without departing from the true spirit and scope of this invention, namely claims.

The invention claimed is:

1. A server equipment for a home appliance network system, the server equipment constituting the home appliance network system along with a portable terminal and a home appliance,
wherein the server equipment comprises:
a communicator configured to communicate with the portable terminal and the home appliance;
a locator configured to acquire information on a position of the portable terminal during communication through the communicator;
an initial screen storage configured to store different position conditions and a collection of screen information defining respective content of initial screens corresponding to the position conditions, per portable terminal; and
a retriever configured, if position information obtained based on the information on the position of the portable terminal acquired through the locator corresponds to any position condition of said different position conditions, to retrieve screen information defining content of an initial screen corresponding to the position condition from the initial screen storage, and to supply the screen information to the portable terminal.

2. The server equipment of claim 1, further comprising:
an appliance controller configured to control the home appliance in accordance with a control instruction supplied through the portable terminal, and
an identifier configured to specify the portable terminal during communication through the communicator.

3. The server equipment of claim 2, comprising an automatic control instruction storage configured to store one or more automatic control instructions, as a control instruction with respect to the home appliance, corresponding to one or more position conditions of said different position conditions, respectively, wherein:
the appliance controller is configured, if the position information obtained based on the information on the position acquired through the locator corresponds to any automatic control instruction of one or more automatic control instructions stored in the automatic control instruction storage, to retrieve the automatic control instruction from the automatic control instruction storage to control the home appliance in accordance with the automatic control instruction; and
the initial screen storage is configured so that one or more initial screens respectively corresponding to one or more automatic control instructions stored in the automatic control instruction storage previously contain control completion notices by the one or more automatic control instructions.

4. The server equipment of claim 1, further comprising a position information storage configured to store a position condition of a house in which the home appliance is installed,
wherein the locator is configured to obtain a distance of the portable terminal from the house as the position information based on the information on the position of the portable terminal and the position information of the house stored in the position information storage.

5. The server equipment of claim 4, comprising an automatic control instruction storage configured to store one or more automatic control instructions, as a control instruction with respect to the home appliance, corresponding to one or more position conditions of said different position conditions, respectively, wherein:
the appliance controller is configured, if the position information obtained based on the information on the position acquired through the locator corresponds to any automatic control instruction of one or more automatic control instructions stored in the automatic control instruction storage, to retrieve the automatic control instruction from the automatic control instruction storage to control the home appliance in accordance with the automatic control instruction; and
the initial screen storage is configured so that one or more initial screens respectively corresponding to one or more automatic control instructions stored in the automatic control instruction storage previously contain control completion notices by the one or more automatic control instructions.

6. The server equipment of claim 1, further comprising a map builder configured to acquire map information,
wherein the locator is configured to obtain a point of the portable terminal on a map as the position information based on the information on the position of the portable terminal and the map information acquired through the map builder.

7. The server equipment of claim 6, comprising an automatic control instruction storage configured to store one or more automatic control instructions, as a control instruction with respect to the home appliance, corresponding to one or more position conditions of said different position conditions, respectively, wherein:
the appliance controller is configured, if the position information obtained based on the information on the position acquired through the locator corresponds to any automatic control instruction of one or more automatic control instructions stored in the automatic control instruction storage, to retrieve the automatic control instruction from the automatic control instruction storage to control the home appliance in accordance with the automatic control instruction; and
the initial screen storage is configured so that one or more initial screens respectively corresponding to one or more automatic control instructions stored in the automatic control instruction storage previously contain control completion notices by the one or more automatic control instructions.

8. A server equipment for a home appliance network system, the server equipment constituting the home appliance network system along with a portable terminal and a home appliance,
wherein the server equipment comprises:
a communicator configured to communicate with the portable terminal and the home appliance;
a locator configured to acquire information on a position of the portable terminal during communication through the communicator;
an initial screen storage configured to store different position conditions and a collection of screen information defining respective content of initial screens corresponding to the position conditions, per portable terminal;
a retriever configured, if position information obtained based on the information on the position of the portable terminal acquired through the locator corresponds to any position condition of said different position conditions, to retrieve screen information defining content of an initial screen corresponding to the position condition from the initial screen storage, and to supply the screen information to the portable terminal; and a position information storage configured to store position information of a house in which the home appliance is installed, a map builder configured to acquire map information, and a priority condition storage, wherein:

the locator is configured to obtain first position information and second position information as said position information, the locator being configured to obtain a distance of the portable terminal from the house based on the information on the position of the portable terminal and the position information of the house stored in the position information storage and to thereby obtain the first position information, the locator being configured to obtain a point of the portable terminal on a map based on the information on the position of the portable terminal and the map information acquired through the map builder and to thereby obtain the second position information; and the initial screen storage is configured to store different first position conditions that are relevant to the first position information and a collection of screen information defining respective content of initial screens corresponding to the first position conditions, the initial screen storage being also configured to store different second position conditions that are relevant to the second position information and a collection of screen information defining respective content of initial screens corresponding to the second position conditions;

the priority condition storage is configured to store first conditions for priority respectively corresponding to the different first position conditions and second conditions for priority respectively corresponding to the different second position conditions;

the retriever is configured, if the first position information obtained through the locator corresponds to any first position condition of the different first position conditions and the second position information obtained through the locator corresponds to any second position condition of the different second position conditions, to read out a first condition for priority and a second condition for priority respectively corresponding to the first position condition and the second position condition from the priority condition storage, to select a position condition corresponding to a condition for priority higher between the first condition for priority and the second condition for priority from the first position condition and the second position condition, and to retrieve screen information defining content of an initial screen corresponding to the selected position condition from the initial screen storage to provide the portable terminal with the screen information.

9. The server equipment of claim 8, comprising an automatic control instruction storage configured to store one or more automatic control instructions, as a control instruction with respect to the home appliance, corresponding to one or more position conditions of said different position conditions, respectively, wherein:

the appliance controller is configured, if the position information obtained based on the information on the position acquired through the locator corresponds to any automatic control instruction of one or more automatic control instructions stored in the automatic control instruction storage, to retrieve the automatic control instruction from the automatic control instruction storage to control the home appliance in accordance with the automatic control instruction; and the initial screen storage is configured so that one or more initial screens respectively corresponding to one or more automatic control instructions stored in the automatic control instruction storage previously contain control completion notices by the one or more automatic control instructions.

* * * * *